Patented Nov. 6, 1934

1,979,971

UNITED STATES PATENT OFFICE 1,979,971

FLAKED RESORCINOL

Ivan Gubelmann, South Milwaukee, Wis., assignor to E. I. du Pont de Nemours & Company, Wilmington, Del., a corporation of Delaware No Drawing. Application July 2, 1932,
Serial No. 620,725

1 Claim.  (Cl. 260—154)

This invention relates to new and useful improvements in the manufacture of resorcinol.

The commonly practiced methods of manufacturing resorcinol on a commercial scale involve in the end the extraction of the resorcinol from its reaction mass by the aid of a solvent, evaporation of the solvent, and distillation of the residual mass to recover therefrom what is known as technical resorcinol. In this process the distillate, after passing through a suitable condenser, is generally run into large metal drums or pails and allowed to solidify. The solid mass thus obtained may be handled and shipped as a unit, or it may be broken up into small pieces.

As thus manufactured, resorcinol suffers from several material defects. The metal drums or pails in which the liquid resorcinol is collected being of the usual commercial size (say, of 300 pounds content), the material naturally requires considerable time for cooling, and in doing so acquires certain objectionable qualities.

In the first place the solid mass eventually obtained is non-uniform both chemically and physically. As is usually the case in cooling large masses, the portions of the mass near the walls of the container solidify first in substantially pure from, crowding out whatever impurities they contained into the central, liquid portions. As cooling continues, the impurities concentrate in the central or core portion, with the result that the latter is of a lesser degree of purity than the surrounding mass. Such heterogeneity of the product is clearly highly objectionable, particularly where one desires to use the product in a chemical process calling for a definite quantity of resorcinol, less than a barrel, and of a definite degree of purity.

Another disadvantage is that resorcinol tends to discolor when maintained in contact with air at higher temperatures, especially those corresponding to its liquid state. This discoloration is apparently due to the formation of various oxidation products. The slow cooling inherent in the solidification of a barrel-size mass affords a great opportunity for the mass to become discolored, and thus contributes highly toward the further contamination of the product.

Finally, the large, solid mass obtained by solidifying a barrel of resorcinol entails mechanical difficulties of handling the product, which are aggravated by the chemical nature of the product and by its physiological effects upon the human body. A solid, ponderous mass is clearly not a convenient form for most practical purposes. Crushing, breaking or grinding it, however, involves certain difficulties in addition to the obvious waste of time and labor. For instance, the chemical nature of resorcinol and its tendency to become disclored in contact with iron, necessitates the use of special crushing or grinding apparatus, made, for instance, of aluminum. Again, finely ground resorcinol is highly deliquescent and tends to cake together very rapidly. Also, the oxidizing effect of the atmosphere upon powdered resorcinol is at its maximum, and the product therefore suffers further contamination during the grinding procedure. Finally, the dust raised during the crushing or grinding of the mass has a corrosive effect upon the human skin and is highly irritating when inhaled by the attendants in charge of the operation.

It is accordingly an object of my invention to provide a process for producing resorcinol in solid state, but of uniform physical texture and chemical composition.

It is a further object of my invention to produce resorcinol in solid state with a minimum amount of discoloration.

It is a further object of my invention to produce resorcinol in solid state, but in a form directly suitable for mechanical handling, without the necessity of subjecting it to wasteful and noxious crushing procedures.

It is a further object of my invention to produce resorcinol in a subdivided, readily pouring, physical form, which has improved stability both physically and chemically as compared to finely ground resorcinol.

Other and further important objects of this invention will appear as the description proceeds.

I accomplish my various objects above set forth by converting resorcinol directly from liquid state into a state of solid, but moderately subdivided particles, such as flakes, chips, shots, pellets, or balls.

I have found that in this form, solid resorcinol is exceedingly more stable toward atmospheric oxidation than in powder form. I have further found that resorcinol in the form of flakes, shots, pellets or crystals is practically free of any tendency to coalesce due to absorption of moisture. I have further found that by my novel form of solidification, I can manipulate the process so as to effect cooling in a very short time interval, thereby reducing to a minimum the discoloration during cooling. Moreover, resorcinol in this novel form is of uniform physical and chemical composition throughout, in the sense that each pound of resorcinol from a given lot contains precisely the same percentage of resorcinol and the same percentage and identity of impurities as any other pound in the same lot. Finally, the facility of mechanical handling of the product in the form of flakes or pellets as compared to a large, solid mass is so obvious as to require no further comment.

The conversion of liquid resorcinol into a moderately divided solid form may be effected in any well known manner. Exposing the liquid mass to rapid cooling in the form of a thin film or small droplets constitutes the essence of my invention. The subdivision of the mass may be effected either after solidification as in the case of flaking, or prior to, or coincident with solidification as in the case, for instance, of dispersion through a cool fluid medium, such as spraying through a nozzle into cool air.

My preferred process consists of flaking, due to the high efficiency and economy of the process, and due to its flexibility, whereby the size or thickness of the resulting particle may be readily controlled within certain limits. Also, this process enables me to employ apparatus of standard design, except for its material. Due to the discoloring effect of iron upon resorcinol, I prefer to use a flaker made of aluminum in all parts thereof that come in contact with the material. Of course, any other metal or alloy which is substantially inert toward resorcinol may be employed. Aside from this limitation, any type of flaking machine may be used.

A well known type of flaker consists of a water cooled cylinder or drum mounted for revolution about a horizontal axis. The lower portion of the drum dips into a tray which contains the molten substance to be flaked. A horizontal knife-edge or scraper presses against one side of the drum whereby to scrape off any solid mass adhering to the drum.

In the practice of my invention, I start with technical resorcinol as obtained in the distillation of crude resorcinol as above described. This product, either while still liquid or after remelting in a suitable steam jacketed vessel, is constantly fed into the tray of the flaker. Cold water is circulated through the drum and the latter revolved. As the dipping portion of the cylinder emerges from the tray it has adhered thereto a coating of solid resorcinol about $\frac{1}{64}$ to $\frac{1}{8}$ inches thick, depending on the temperature of the drum, the temperature of the molten mass, and the speed of revolution. This coating is carried along by the drum until it impinges upon the knife edge or scraper. Here it breaks off, crumbles into flakes of irregular shape and size, and falls into a receiver. The average size of flake thus produced is probably $\frac{1}{4}$ to 1 inch in the longer dimension.

It will be understood that although I described my process and my preferred flaker with particularity, my invention is not limited to such details. Any other type of flaker may be used, and the process may be somewhat varied depending on the particular machine employed or other circumstances.

My invention is not limited to this type of flaker or to any other particular flaker. In fact, it need not be limited to a flaking process at all, but may consist of or include the step of dispersing molten resorcinol through a cool fluid medium such as air, carbon dioxide or an inert organic liquid, by the aid of a nozzle, a spray, or a cooling tower. The gist of my invention as explained above, consists in the production of resorcinol in a solid, moderately divided form, of uniform physical structure and chemical composition, and of a size permitting of rapid cooling.

I claim:

As a new product of manufacture, resorcinol in the form of flakes of substantially uniform physical appearance and chemical composition.

IVAN GUBELMANN.